(12) United States Patent
Wang (10) Patent No.: US 8,396,151 B2
(45) Date of Patent: Mar. 12, 2013

(54) TIMING TRACKING IN A MULTIPLE RECEIVE ANTENNA SYSTEM

(75) Inventor: Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1092 days.

(21) Appl. No.: 11/613,955

(22) Filed: Dec. 20, 2006

(65) Prior Publication Data

US 2008/0130805 A1  Jun. 5, 2008

Related U.S. Application Data

(60) Provisional application No. 60/862,119, filed on Oct. 19, 2006.

(51) Int. Cl.
*H04B 7/02* (2006.01)

(52) U.S. Cl. ........................................................ 375/267

(58) Field of Classification Search ................ 375/267, 375/132, 148, 260; 455/450
See application file for complete search history.

(56) References Cited

U.S. PATENT DOCUMENTS

| | | | | |
|---|---|---|---|---|
| 6,956,893 | B2* | 10/2005 | Frank et al. ................... | 375/147 |
| 7,366,089 | B2 | 4/2008 | Tehrani et al. | |
| 2003/0108091 | A1* | 6/2003 | Nishio et al. ................ | 375/148 |
| 2003/0228887 | A1* | 12/2003 | Kishigami et al. .......... | 455/561 |
| 2004/0047284 | A1* | 3/2004 | Eidson ........................ | 370/203 |
| 2004/0142729 | A1* | 7/2004 | Yuda et al. ................ | 455/562.1 |
| 2004/0234003 | A1* | 11/2004 | Alamouti et al. ........... | 375/267 |
| 2005/0176436 | A1* | 8/2005 | Mantravadi et al. ......... | 455/450 |
| 2006/0165187 | A1 | 7/2006 | Troya et al. | |
| 2006/0165197 | A1 | 7/2006 | Morita et al. | |
| 2006/0187816 | A1* | 8/2006 | Kim et al. ................... | 370/208 |
| 2006/0193391 | A1* | 8/2006 | Borran et al. ............... | 375/260 |
| 2006/0274820 | A1* | 12/2006 | Walton et al. ............... | 375/148 |
| 2008/0159123 | A1* | 7/2008 | Tehrani et al. .............. | 370/208 |
| 2008/0240204 | A1* | 10/2008 | Heidari-Bateni et al. ..... | 375/132 |

FOREIGN PATENT DOCUMENTS

| | | |
|---|---|---|
| JP | 2004320445 A | 11/2004 |
| KR | 20060093258 | 8/2006 |
| WO | WO2005036848 | 4/2005 |
| WO | 2006099240 | 9/2006 |

OTHER PUBLICATIONS

International Search Report, PCT/US07/081858, International Search Authority, European Patent Office, May 16, 2008.
Written Opinion, PCT/US07/081858, International Search Authority, European Patent Office, May 16, 2008.
Zelst, A. et al., "Implementation of a MIMO OFDM-Based Wireless LAN System," IEEE Transactions on Signal Processing, Feb. 1, 2004, pp. 483-494. vol. 52, No. 2, IEEE Service Center, New York, NY, USA, XP011105733.

(Continued)

*Primary Examiner* — Jaison Joseph
(74) *Attorney, Agent, or Firm* — Donald C. Kordich (57) ABSTRACT

Apparatus and methods for determining timing tracking in a multiple antenna wireless system are disclosed. Timing tracking is obtained, in particular, by determining at least two channel density profiles for signals respectively received by at least two antennas of multiple receive antenna wireless device. The channel density profiles are then combined, such as by summing, to form a composite channel density profile. The composite is, in turn, used by a timing tracking algorithm to determine a timing decision for setting the timing tracking in a transceiver device used in the multiple antenna wireless system. Use of a composite density profile affords the system increased resistance to channel dynamics such as fading, birth and death, which reduces degradation due to mistiming caused by such channel dynamics.

45 Claims, 6 Drawing Sheets

OTHER PUBLICATIONS

Taiwan Search Report—TW096139358—TIPO—May 9, 2011.
Schenk T. C. W., et al., "Implementation of a MIMO OFDM-Based Wireless LAN System" IEEE Transactions on Signal Processing, IEEE Service Center, New York, NY, US, vol. 52, No. 2, Feb. 1, 2004, pp. 483-494, XP011105733 ISSN: 1053-587X p. 483, right-hand column—p. 484, left-hand column figures 1,2 p. 488, right-hand column—p. 490, left-hand column.

* cited by examiner

TIMING TRACKING IN A MULTIPLE RECEIVE ANTENNA SYSTEM

CLAIM OF PRIORITY UNDER 35 U.S.C. §119

The present application for patent claims priority to Provisional Application No. 60/862,119 entitled "TIMING TRACKING IN A MULTIPLE RECEIVE ANTENNA OFDM SYSTEM" filed Oct. 19, 2006, and assigned to the assignee hereof and hereby expressly incorporated by reference herein.

REFERENCE TO CO-PENDING APPLICATIONS FOR PATENT

The present application for patent is related to the following co-pending U.S. patent applications:

U.S. patent application Ser. No. 11/264,532 filed Oct. 31, 2005, entitled "METHODS AND APPARATUS FOR DETERMINING TIMING IN A WIRELESS COMMUNICATION SYSTEM" by Michael Wang et al., and assigned to the assignee hereof, and expressly incorporated by reference herein.

BACKGROUND

1. Field

The present disclosure relates to wireless communications and, more particularly to apparatus and methods for timing tracking in a multiple receive antenna system.

2. Background

Certain types of communication systems such as those using Orthogonal Frequency Division Multiplexing (OFDM), for example, are highly sensitive to synchronization errors such as timing error and frequency error. In order for these types of systems to work properly, the receiver portion of a transceiver and the transmitter from which symbols are transmitted to the transceiver have to be synchronized, which includes timing and frequency synchronization. Ideally, synchronization and timing in the receiver portion should follow the transmitter. In OFDM systems, for example, timing tracking or synchronization involves finding the optimum sampling start position for a next OFDM symbol based on the current OFDM symbol channel. Thus, unless the correct timing is known, the transceiver cannot remove cyclic prefixes occurring between symbols at the right timing instant and correctly separate individual symbols before computing a Fast Fourier Transformation (FFT) of the sample for demodulating the symbol in the case of OFDM.

Accordingly, a goal of timing tracking in a system such as an OFDM system is to find the optimum sampling start position of a sampling window for the next OFDM symbol or channel given the current OFDM symbol or channel. The sampling position should be chosen such that intersymbol interference (ISI) as well as intercarrier interference (ICI), which are termed as the "effective interference" (EI), caused by the existing channel profile is suppressed and the signal-to-noise ratio (SNR) is correspondingly increased. Sources of EI can be classified into a number of types. The first type is static EI that, given the current channel profile, is a deterministic EI determined by the OFDM symbol structure, e.g., the length of a cyclic prefix. In a dynamic environment, however, channel time variation (new arrival paths that may appear in the future) and system timing error (e.g., sleep timing error) may also introduce EI. This EI can be typified as a dynamic EI that is random in nature and best described by probabilistic models. Another type of EI arises from channel fading, where faded channel taps may also affect the timing decision causing EI.

Pending U.S. patent application Ser. No. 11/264,532, which is incorporated herein, discloses methodology and apparatus for determining timing of a symbol in a wireless system that minimizes one or more of the three types of effective interference (EI) discussed above. By setting timing in a transceiver or a similar device to ensure minimization of the total effective interference (EI) (i.e., minimization of ISI and ICI and maximization of signal energy), performance of the transceiver to decode and demodulate is better optimized. In particular, the timing of a timing window is determined by taking into account at least one or more of the three different sources of effective interference (EI), namely static EI, dynamic EI and EI due to faded channel taps. This accounting may be accomplished by analytically deriving a composite EI function that combines the three types of EI into an effective EI channel density function.

Additionally, wireless communication systems may utilize a multiple receive antenna system in order to improve receive signal diversity and/or the capacity of the wireless system, such as an OFDM system. For instance, a multiple-input-multiple-output (MIMO) system, as one example of a multiple receive antenna system, employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where each of the $N_S$ independent channels corresponds to a dimension. The MIMO system can provide improved performance (e.g., higher throughput and/or greater reliability) if the additional dimensionalities created by the multiple transmit and receive antennas are utilized. With the increase in the number of antennas in such systems, however, comes a resultant increase in system sensitivity to channel estimation errors.

SUMMARY

According to an aspect of the present disclosure, a method for use in a wireless communication system is disclosed. The method includes determining at least two channel density profiles for signals respectively received by antennas of a multiple antenna wireless device. Further, the method includes combining the at least two channel density profiles to form a composite channel density profile.

According to another aspect of the present disclosure, an apparatus operable in a wireless communication system is disclosed. The apparatus includes first and second antennas to receive wireless communication signals. The apparatus also includes first and second channel estimators to respectively determine a channel density profile of signals received by the first and second antennas. A combiner configured to combine the channel density profiles to form a composite channel density profile is further included.

According to yet another aspect, a processor for use in a wireless transceiver is disclosed. The processor is configured to determine at least two channel density profiles for signals respectively received by antennas of a multiple antenna wireless device. Additionally, the processor is configured to combine the at least two channel density profiles to form a composite channel density profile.

According to still another aspect, an apparatus operable in wireless communication system is disclosed. The apparatus includes means for determining at least two channel density profiles for signals received by corresponding antennas of a multiple receive antenna device, and means for combining the at least two channel density profiles to form a composite channel density profile.

According to another aspect, a computer program product is disclosed having a computer-readable medium. The computer-readable medium includes code for causing a computer to determine at least two channel density profiles for signals respectively received by antennas of a multiple antenna wireless device. The computer-readable medium further includes code for causing the computer to combine the at least two channel density profiles to form a composite channel density profile.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The present application discloses apparatus and methods for timing tracking in a multiple receive antenna system, such as an OFDM symbol timing in multiple receive antenna OFDM transceiver. Additionally, by accounting for one or more of dynamic channel effects discussed above and in U.S. application Ser. No. 11/264,532 in signals received by each of the antennas, and combining resultant channel density profiles, timing tracking can be optimized for an OFDM system.

Figure 1:
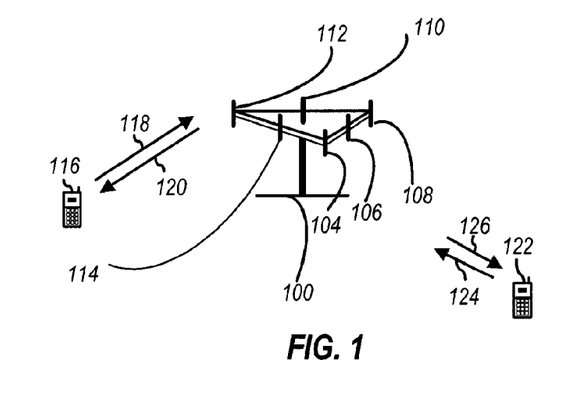
FIG. 1 illustrates a multiple access wireless communication system according to a disclosed example.

FIG. 1 shows an exemplary multiple access wireless communication system according to the present disclosure. An access point (AP) 100 includes multiple antenna groups, one including 104 and 106, another including 108 and 110, and yet one other including 112 and 114. In FIG. 1, only two antennas are shown for each antenna group, however, more or less antennas may be utilized for each antenna group. An access terminal (AT) 116 is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, as an example, communication links 118, 120, 124, and 126 may use different frequencies for communication. For example, forward link 120 may use a different frequency than that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beam forming in order to improve the signal-to-noise ratio (SNR) of forward links for the different access terminals 116 and 124. Also, an access point using beam forming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal, or some other terminology.

Figure 2:
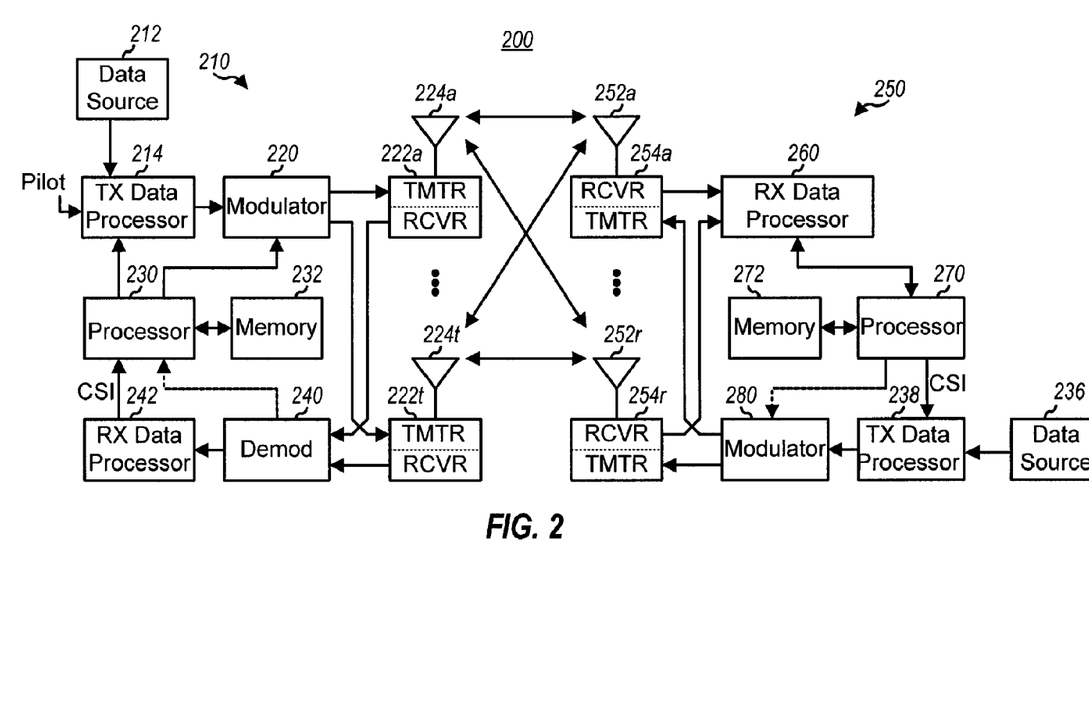
FIG. 2 is a block diagram of a multiple antenna wireless communication system.

FIG. 2 is a block diagram of an exemplary transmitter system 210 (e.g., an access point (AP)) and a receiver system 250 (e.g., an access terminal (AT)) in a system 200 utilizing multiple transmit and multiple receive antennas At the transmitter system 210, traffic data is provided from a data source 212 to a transmit (TX) data processor 214.

In one example, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at a receiver to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a modulator 220, which may further process the modulation symbols (e.g., for OFDM). TX modulator 220 then provides Nt modulation symbol streams to Nt transmitters (TMTR) 222a through 222t.

Each transmitter 222 receives and processes a respective symbol stream to provide one or more analog signals, and further conditions (e.g., amplifies, filters, and up-converts) the analog signals to provide a modulated signal suitable for transmission over the wireless channel. Nt modulated signals from transmitters 222a through 222t are then transmitted from Nt antennas 224a through 224t, respectively.

At receiver system 250, the transmitted modulated signals are received by Nr antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the Nr received symbol streams from Nr receivers 254 based on a particular receiver processing technique to provide Nt "detected" symbol streams. The RX data processor 260 then demodulates, deinterleaves, and decodes each detected symbol stream to recover the traffic data for the data stream. The processing by RX data processor 260 is complementary to that performed by TX modulator 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beam forming weights then processes the extracted message.

Figure 3:
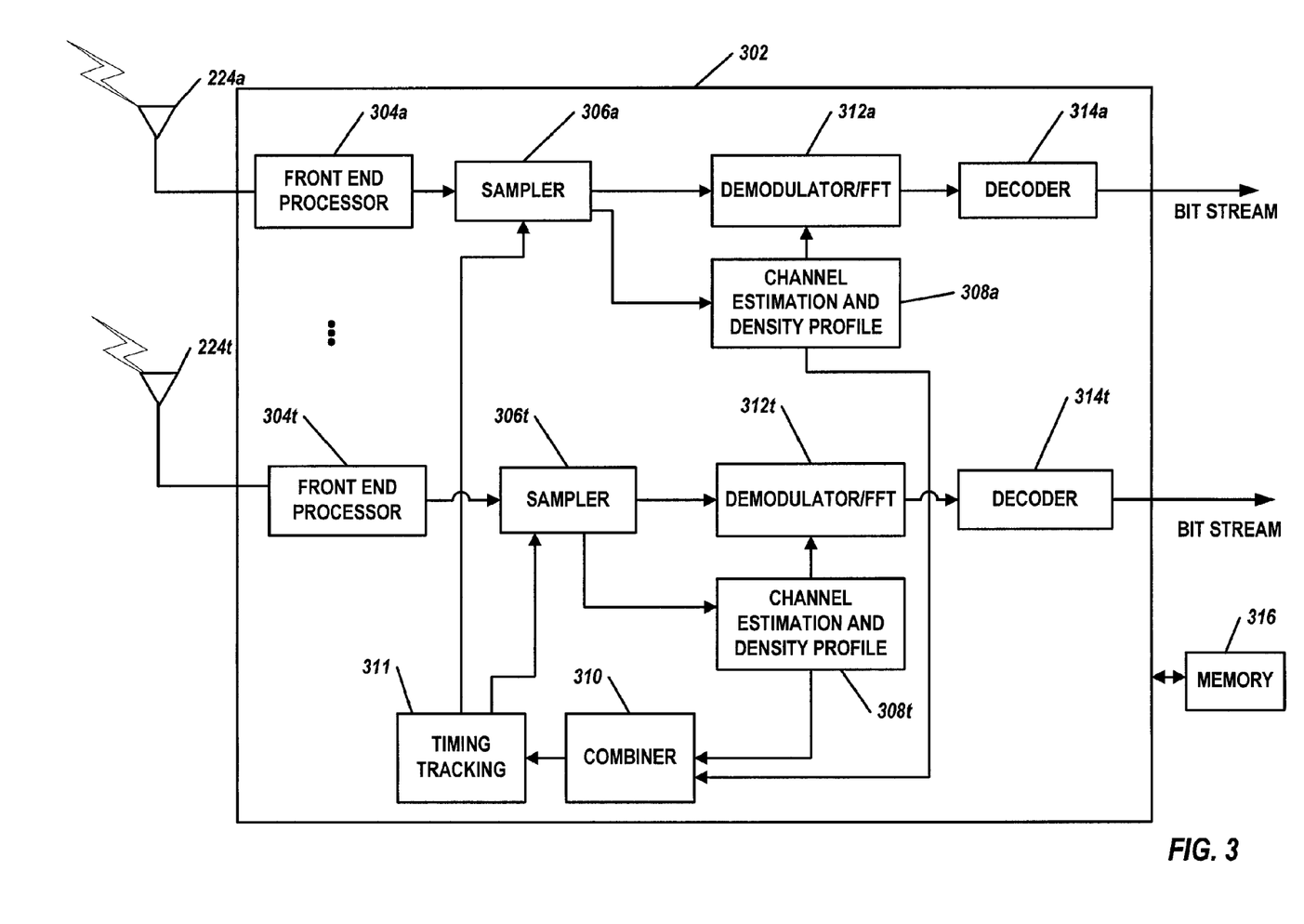
FIG. 3 shows a block diagram of a transceiver for use in a multiple antenna communication system.

FIG. 3 shows an exemplary receiver portion of a transceiver or a receive processor 302 for use in a transceiver, such as an OFDM transceiver with multiple receive antennas used in the system of FIG. 2. In particular, the processor 302 may be implemented by processors 242, 260, 230 and 270, or combinations of processors 242 and 230 or 260 and 270. As illustrated, the receiver portion 302 includes multiple antennas 224a, 224t that receive one or more transmitted wireless signals. In the example of FIG. 3, each signal received by two or more antennas 224a to 224t is respectively fed to a front-end-processor (304a-304t), which provides down conversion, A/D conversion and AGC (Automatic Gain Control), as examples. Front end processors 304a to 304t respectively output processed signals to samplers 306a to 306t.

The samplers 306a, 306t are the portion of the transceiver 302 that effect the actual timing window for sampling the subcarriers or bins within the received signals. The output of the samplers 306a, 306t, which are synchronized digital signals, are input to both channel estimation and density profile unit 308a to 308t and demodulator/FFT units 312a to 312t. The channel estimation and density profile units 308a, 308t first perform coherent detection, as an example, using pilot tones inserted by the transmitter into the symbols of the digital signal. Then, units 308a, 308t perform channel estimation that yields an impulse response and frequency response of each channel.

Turning back to FIG. 3, after each channel estimation and density profile unit 308a 308t determines a channel energy density profile, the total resultant profiles are combined by combiner 310. This unit may simply sum the resultant channel density energy profiles. These combined channel density energy profile is then fed to a timing tracking unit 311 (e.g., an algorithm run in software or a hardware unit), which determines, for example, a timing tracking decision or calculation, which in turn fed to and used by the samplers 306a to 306t for establishing the timing windows or timing synchronization of the samplers 306. It is noted that the determined timing decision may also be used by the demodulator/FFT units 312a to 312t, although this connection between the timing tracking unit 311 and the demodulator/FFT units 312a to 312t is not illustrated.

After demodulation of the signals, a decoder 314a, 314t decodes the signals based on the predetermined encoding of the signals and outputs the decoded bit streams to other processors or processor functions within the receiver portion of a wireless device.

Figure 4:
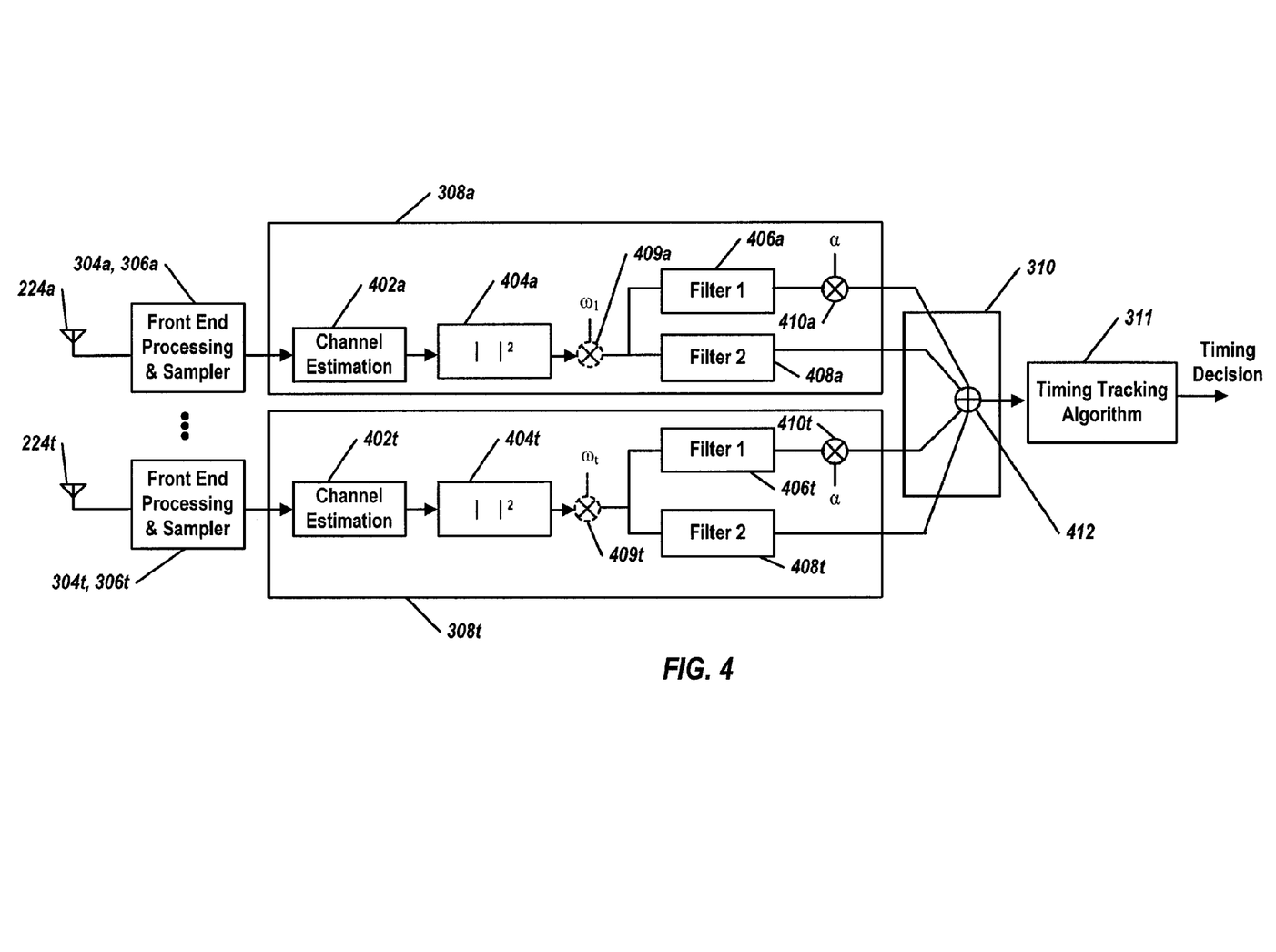
FIG. 4 is a block diagram of an exemplary apparatus for determining timing tracking in a multiple antenna transceiver.

FIG. 4 is a diagram of the functional blocks that are utilized to determine the composite channel energy density profile. It is noted that the system illustrated in FIG. 4 may be used in the systems illustrated in FIGS. 2 and 3, and therefore use like reference numbers for correlative elements. As shown, the system of FIG. 4 includes multiple receive antennas 224a to 224t, which input received signals to front end processors and samplers 304a, 304t, 306a, 306t which were discussed previously. After processing by processors and samplers 304a, 304t, 306a, 306t, the processed signals are delivered to the channel estimation and density profile units 308a, 308t. In particular, the signals are first input to channel estimation units 402a, 402t, which determine a channel profile using the methodology discussed above and in U.S. patent application Ser. No. 11/264,532.

After channel estimation units 402a, 402t determine the channel energy profile, a density calculator 404a, 404t calculates an instantaneous channel energy density profile by calculating the square of the magnitude of the channel energy profile. The output channel energy density profile is then input to pairs of first and second low pass filters 406a and 408a to 406t and 408t. The first low pass filters 406a, 406t are configured to have a narrower bandwidth than the second low pass filters 408a, 408t and are configured to reduce the channel fluctuation due to fading. The second low pass filters 408a, 408t having a wider bandwidth, on the other hand, are configured to filter out estimation noise to improve the channel energy profile density estimation.

It is noted that channel fading affects the dynamic or "instantaneous" portion of the channel energy density profile, in particular. Such channel fading may lead to timing synchronization errors. In order to compensate for this fading, the present system includes the second or "fast" filters 408 to account for the short term fading, current or instantaneous characteristics of the channel energy density profile to minimize timing errors due the dynamic qualities of the channel. Utilization of the wider bandwidth first or "slow" filters 406, in contrast, is used to minimize the effect of longer term channel amplitude variation due to fading in order to obtain a long-term channel energy density profile estimate.

In order to account for both short and long-term fading effects, a balance between the long-term channel characteristics and the short term or instantaneous channel activity is achieved by superposition or adding of the outputs of the first and second filters 406, 408 by combiner 310, which yields a composite energy density profile. Accordingly, the presently disclosed system of FIG. 4 engenders finding a timing position to balance both the long and short-term channel behaviors. Thus, by taking into account the effects due to these types of fading, a more accurate estimation of the start of timing may be obtained.

Figure 5:
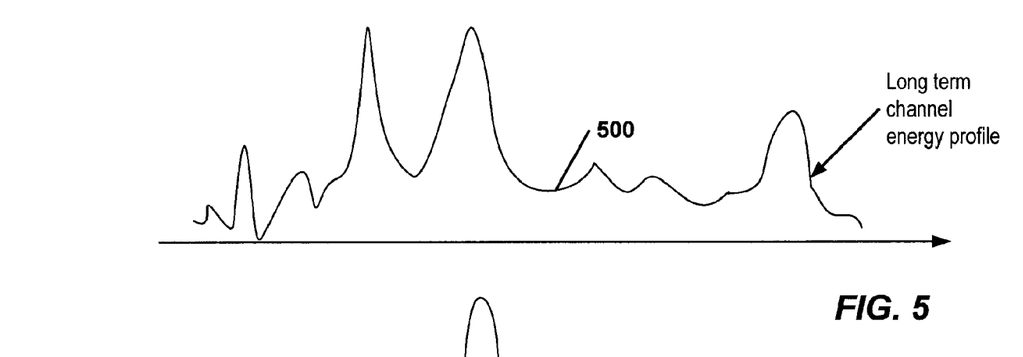
FIG. 5 is a plot showing an example of a long-term channel energy profile.
Figure 6:
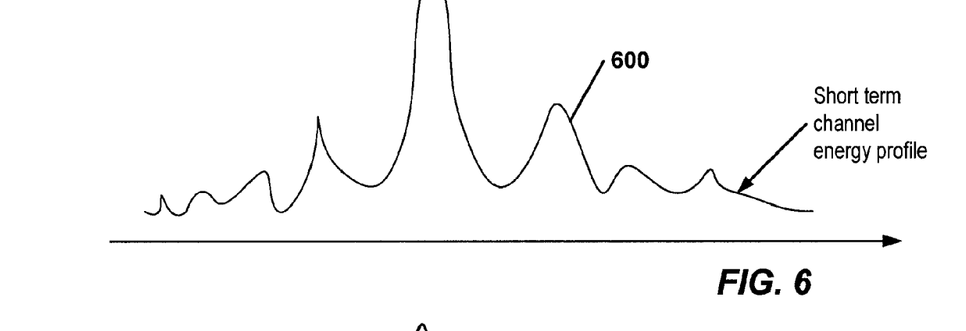
FIG. 6 is a plot showing an example of a short-term channel energy profile.
Figure 7:
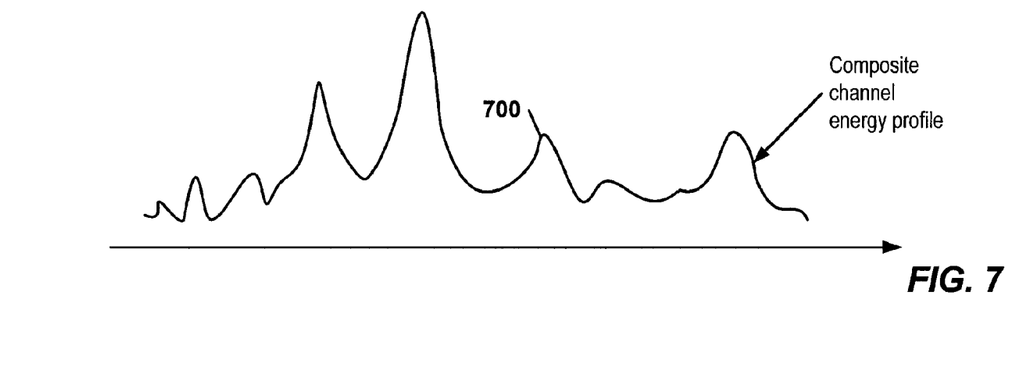
FIG. 7 is a plot of a composite channel energy profile of the sum of the long term and short-term energy profiles illustrated respectively in FIGS. 9 and 10.

FIGS. 5-7 illustrate an example of the combination or superposition of the long and short-term channel effects of the channel energy density profile. In particular, FIG. 5 illustrates an example of a long-term channel energy profile 500. The profile illustrated in FIG. 6, on the other hand, is an exemplary short-term channel energy profile 600. The combination of the long and short-term energy profiles, which is a composite channel energy profile, is illustrated by plot 700 in FIG. 7. The composite channel energy profile 700 is thus the sum of the long term and short-term energy profiles 500 and 600 illustrated respectively in FIGS. 5 and 6.

As further illustrated in FIG. 4, the output of the first filters 406 may be input to multiplier blocks or units 410a to 410t, which multiplies the long term channel energy density profile by a weighting factor α (a value between 0 and 1), which weights the degree to which the long term channel energy density profile affects the composite channel energy density profile for purpose of the rate of timing tracking. Thus, for example, if the value of a is small, the effect of the long term profile is reduced and the sum of the long term and short profiles yields a composite profile that in favor of the short term profile. The effect of this is a faster timing tracking. Conversely, a larger value of α yields slower timing tracking.

Finally, it is noted that the fast and slow channel energy density profiles from all of the antennas in the system of FIG. 4 are combined by combiner 310, which is an additive function (e.g., summing block 412) to form a total composite channel density profile. This total composite is then input to the timing tracking unit or algorithm 311 for determination of a timing decision used by the samplers 306 exemplified in FIG. 3.

One skilled in the art will appreciate that the system of FIG. 4 may be implemented without accounting for the dynamic channel fading effects through the use of filters 406, 408. Furthermore, the system of FIG. 4 may include optional multiplication blocks 409a to 409t, which multiply the computed channel energy density profile by a weighting factors $\omega_1$ to $\omega_t$, which weight the effect each particular channel energy density profile from each antenna has on the composite energy density profile. This use of weighting may be helpful for unbalanced antenna systems, for example.

Figure 8:
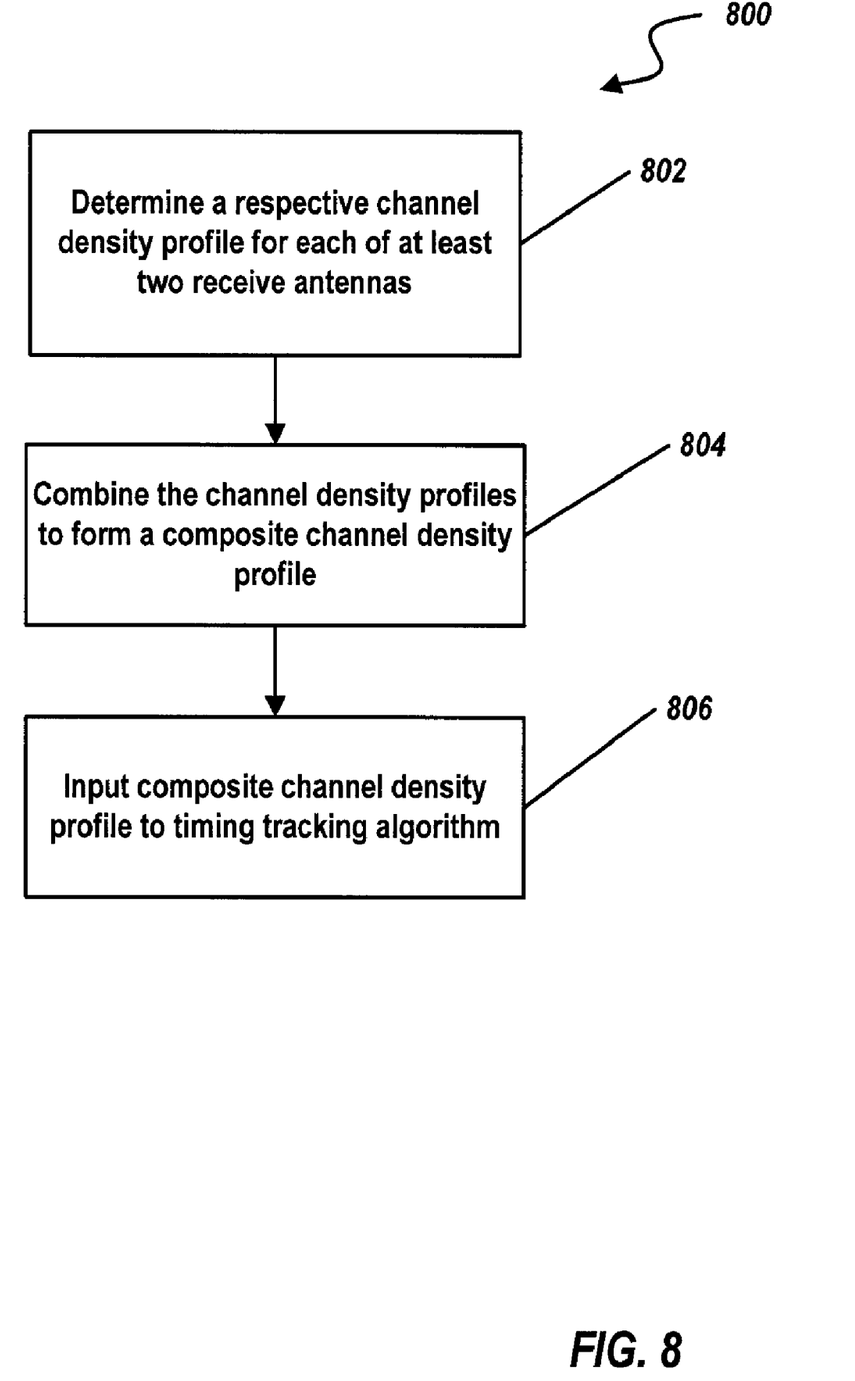
FIG. 8 is a plot of a method for determining timing tracking.
Figure 9:
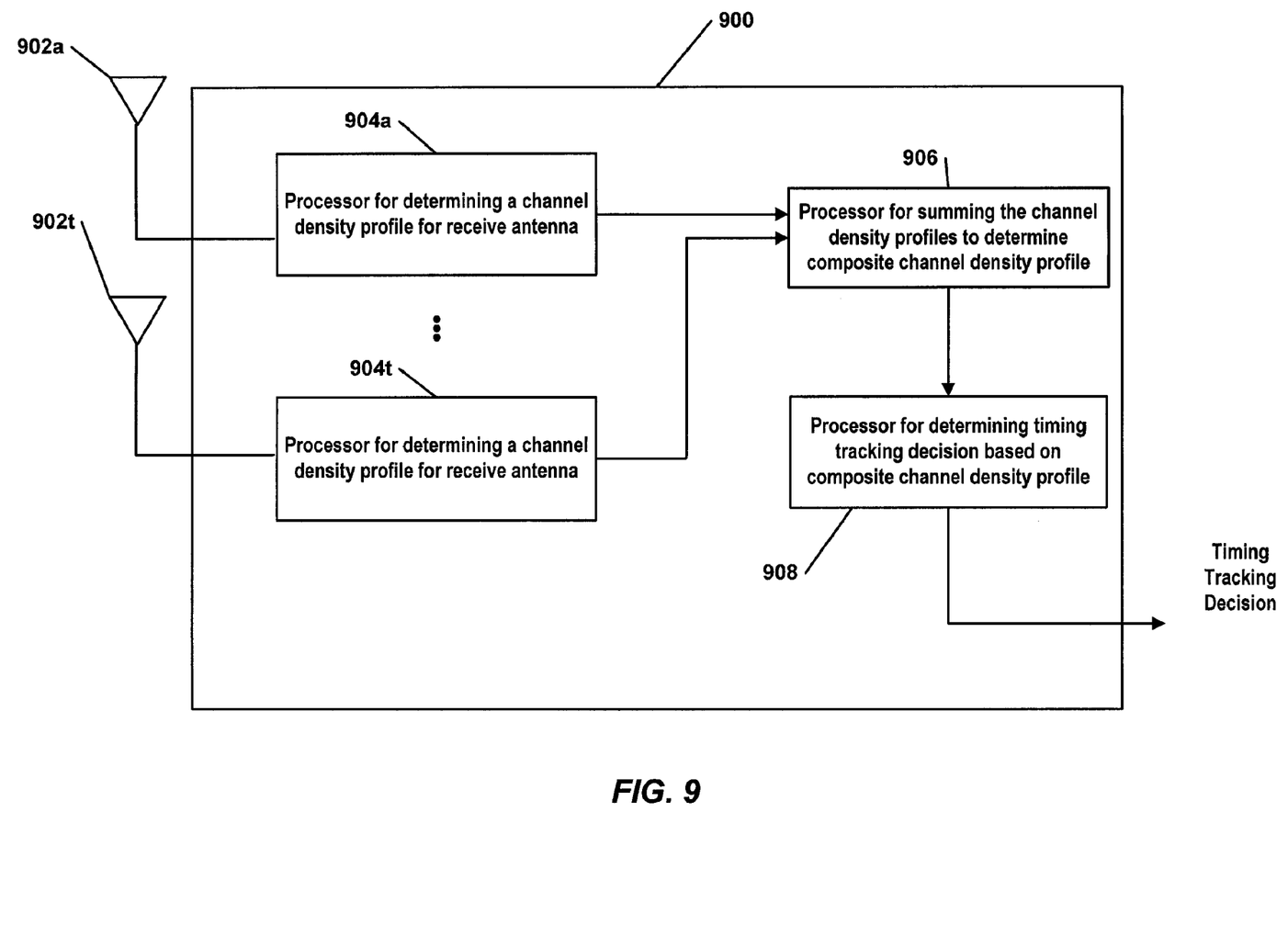
FIG. 9 is an exemplary apparatus for determining timing tracking in a wireless transceiver having multiple antennas.

FIG. 8 is a flow diagram of an exemplary method 800 for determining timing tracking in a multiple antenna transceiver, such as the transceivers illustrated in FIGS. 2, 3, and 4. As illustrated, the method 800 begins with block 802, where a respective channel density profile is determined for each of at least two receive antennas. Once the channel density profiles are determined, the method 800 proceeds to block 804 where the channel density profiles are combined to form a composite channel density profile. The method 800 then proceeds to block 806 where the composite channel density profile is input to a timing tracking algorithm, which determines a timing decision based on the composite channel density profile. It is noted that the method 800 is repeated for each symbol received by each antenna, so that the timing decision is continuously updated FIG. 9 is a block diagram of another apparatus 900 for determining timing tracking in a multiple antenna transceiver. As illustrated, the apparatus receives input signals from two or more antennas such as 902a and 902t. The received signals are respectively input to processors 904a, 904t for determining a channel density profile for the respective receive antenna. It is noted that processors 904 may be effected by the channel estimation and density profile unit 308 as illustrated in FIGS. 3 and 4. After channel density profiles have been determined by processors 904a to 904t, outputs from each of the processors 904 are input to a processor 906 for summing the channel density profiles in order to calculate a composite channel density profile, which is the sum of all the channel density profiles. It is noted that processor 906 may be effected by combiner 310 as illustrated in FIG. 3.

After processor 906 has determined a composite channel density profile, the processor 906 outputs the composite to a processor 908 for determining a timing tracking decision based on composite channel density profile. Processor 908 may be implemented by a timing tracking algorithm such as 311 shown n FIGS. 3 and 4. The result of the processor 908 is a timing decision, which may be utilized by a sampler, such as samplers 306 or an equivalent device or functionality in a wireless receiver unit.

In light of the foregoing, the disclosed apparatus and methods effect a composite channel energy density profile that has increased resistance to channel dynamics such as fading, birth and death. Accordingly, the apparatus and methods engender a timing decision from a timing tracking algorithm that reduces performance degradation due to mistiming caused by dynamics of channels.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (e.g., memory 316 in FIG. 3) is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

What is claimed is:

1. A method for use in a wireless communication system, the method comprising:
    determining at least two coherent channel impulse responses based on signals respectively received by at least two antennas of a multiple antenna wireless device;
    determining at least two incoherent channel energy density profiles respectively based on the coherent channel impulse responses, wherein the at least two incoherent channel energy density profiles comprise at least a first channel energy density profile and a second channel energy density profile;
    filtering the first channel energy density profile with a first low pass filter having a first bandwidth to generate a first filtered channel energy density profile;
    filtering the first channel energy density profile with a second low pass filter having a second bandwidth to generate a second filtered channel energy density profile, wherein the first bandwidth is narrower than the second bandwidth; and
    combining at least the first and second filtered channel energy density profiles to form a composite channel energy density profile.

2. The method as defined in claim 1, wherein filtering the first channel energy density profile with the second low pass filter includes filtering out estimation noise from the first channel energy density profile.

3. The method as defined in claim 1, wherein filtering the first channel energy density profile with the first low pass filter includes filtering out channel fluctuations due to fading from the first channel energy density profile.

4. The method as defined in claim 1, wherein filtering the first channel energy density profile with the second low pass filter includes filtering to account for instantaneous channel behavior in the first channel energy density profile.

5. The method as defined in claim 1, wherein filtering the first channel energy profile with the first low pass filter includes filtering to account for long-term channel behavior in the first channel energy density profile.

6. The method as defined in claim 1, further comprising:
    multiplying the first filtered channel energy density profile by a weighting factor operable to selectively weight the effect of the first filtered channel energy density profile in order to effect a rate of timing tracking.

7. The method as defined in claim 1, further comprising:
    multiplying the first channel energy density profile by a corresponding weighting factor operable to weight the contribution of the first channel energy density profile in the composite channel energy density profile.

8. The method as defined in claim 1, further comprising:
    inputting the composite channel energy density profile to a timing tracking algorithm, which determines a timing decision based at least in part on the composite channel energy density profile.

9. The method as defined in claim 1, further comprising:
    filtering the second channel energy density profile with a third low pass filter having a third bandwidth to generate a third filtered channel energy density profile; and
    filtering the second channel energy density profile with a fourth low pass filter having a fourth bandwidth to generate a fourth filtered channel energy density profile, wherein the third bandwidth is narrower than the fourth bandwidth,
    wherein combining comprises combining at least the first, second, third, and fourth filtered channel energy density profiles to form the composite channel energy density profile.

10. An apparatus operable in a wireless communication system comprising:
    first and second antennas to receive wireless communication signals;
    first and second channel estimators to respectively determine a coherent channel impulse response based on respective signals received by the first and second antennas;
    first and second density calculators to respectively determine a first incoherent channel energy density profile and a second incoherent channel energy density profile based on the respective first and second coherent channel impulse responses;
    a first low pass filter having a first bandwidth to filter the first incoherent channel energy density profile to generate a first filtered channel energy density profile;
    a second low pass filter having a second bandwidth to filter the first incoherent channel energy density profile to generate a second filtered channel energy density profile, wherein the first bandwidth is narrower than the second bandwidth; and
    a combiner configured to combine at least the first and second filtered channel energy density profiles to form a composite channel energy density profile.

11. The apparatus as defined in claim 10, wherein the second low pass filter is configured to filter out estimation noise from the first incoherent channel energy density profile.

12. The apparatus as defined in claim 10, wherein the first low pass filter is configured to filter out channel fluctuations due to fading from the first incoherent channel energy density profile.

13. The apparatus as defined in claim 10, wherein the second filter is configured to account for instantaneous channel behavior in the first incoherent channel energy density profile and the first filter is configured to account for long term channel behavior in the first incoherent channel energy density profile.

14. The apparatus as defined in claim 10, further comprising:

a multiplier unit configured to multiply the first filtered channel energy density by a weighting factor operable to selectively weight the effect of the first filtered channel energy density profile filtered in order to effect a rate of timing tracking.

15. The apparatus as defined in claim 10, further comprising:
a multiplier unit configured to multiply the first incoherent channel energy density profile by a corresponding weighting factor operable to weight the contribution of the first incoherent channel energy density profile in the composite channel energy density profile.

16. The apparatus as defined in claim 10, further comprising:
a timing tracking unit to receive the composite channel energy density profile and configured to determine a timing decision based at least in part on the composite channel energy density profile.

17. The apparatus as defined in claim 10, further comprising:
a third low pass filter having a third bandwidth to filter the second incoherent channel energy density profile to generate a third filtered channel energy density profile; and
a fourth low pass filter having a fourth bandwidth to filter the second incoherent channel energy density profile to generate a fourth filtered channel energy density profile, wherein the third bandwidth is narrower than the fourth bandwidth,
wherein the combiner is configured to combine at least the first, second, third, and fourth filtered channel energy density profiles to form the composite channel energy density profile.

18. A processor for use in a wireless transceiver, the processor configured to:
determine at least two coherent channel impulse responses based on signals respectively received by at least two antennas of a multiple antenna wireless device;
determine at least two incoherent channel energy density profiles respectively based on the coherent channel impulse responses, wherein the at least two incoherent channel energy density profiles comprise at least a first channel energy density profile and a second channel energy density profile;
filter the first channel energy density profile with a first low pass filter having a first bandwidth to generate a first filtered channel energy density profile;
filter the first channel energy density profile with a second low pass filter having a second bandwidth to generate a second filtered channel energy density profile, wherein the first bandwidth is narrower than the second bandwidth; and
combine at least the first and second filtered channel energy density profiles to form a composite channel energy density profile.

19. The processor as defined in claim 18, wherein the processor is further configured to filter out estimation noise from the first channel energy density profile with the second low pass filter.

20. The processor as defined in claim 18, wherein the processor is further configured to filter out channel fluctuations due to fading from the first channel energy density profile with the first low pass filter.

21. The processor as defined in claim 18, wherein the processor is further configured to filter to account for instantaneous channel behavior in the first channel energy density profile with the second low pass filter.

22. The processor as defined in claim 18, wherein the processor is further configured to filter to account for long term channel behavior in the first channel energy density profile with the first low pass filter.

23. The processor as defined in claim 18, wherein the processor is further configured to multiply the first filtered channel energy density profile by a weighting factor operable to selectively weight the effect of the first filtered channel energy density profile in order to effect a rate of timing tracking.

24. The processor as defined in claim 18, wherein the processor is further configured to multiply the first channel energy density profile by a corresponding weighting factor operable to weight the contribution of the first channel energy density profile in the composite channel energy density profile.

25. A processor as defined in claim 18, wherein the processor is further configured to input the composite channel energy density profile to a timing tracking algorithm, which determines a timing decision based at least in part on the composite channel energy density profile.

26. The processor as defined in the claim 18, wherein the processor is further configured to:
filter the second channel energy density profile with a third low pass filter having a third bandwidth to generate a third filtered channel energy density profile, and
filter the second channel energy density profile with a fourth low pass filter having a fourth bandwidth to generate a fourth filtered channel energy density profile, wherein the third bandwidth is narrower than the fourth bandwidth, and
wherein the processor is configured to combine at least the first, second, third, and fourth filtered channel energy density profiles to form the composite channel energy density profile.

27. An apparatus operable in wireless communication system, the apparatus comprising:
means for determining at least two coherent channel impulse responses based on signals received by corresponding antennas of a multiple receive antenna device;
means for determining at least two incoherent channel energy density profiles respectively based on the coherent channel impulse responses, wherein the at least two incoherent channel energy density profiles comprise at least a first channel energy density profile and a second channel energy density profile;
a first means for filtering the first channel energy density profile to generate a first filtered channel energy density profile, the first means for filtering having a first bandwidth;
a second means for filtering the first channel energy density profile to generate a second filtered channel energy density profile, the second means for filtering having a second bandwidth, wherein the first bandwidth is narrower than the second bandwidth; and
means for combining at least the first and second filtered channel energy density profiles to form a composite channel energy density profile.

28. The apparatus as defined in claim 27, further comprising:
means for determining a timing tracking decision based on the composite channel energy density profile.

29. The apparatus as defined in claim 27, wherein the second means for filtering includes means for filtering out estimation noise from at least one the first channel energy density profile.

30. The apparatus as defined in claim 27, wherein the first means for filtering includes means for filtering out channel fluctuations due to fading from the first channel energy density profile.

31. The apparatus as defined in claim 27, wherein the second means for filtering includes means for filtering to account for instantaneous channel behavior in the first channel energy density profile.

32. The apparatus as defined in claim 27, wherein the first means for filtering includes means for filtering to account for long-term channel behavior in the first channel energy density profile.

33. The apparatus as defined in claim 27, further comprising:
means for multiplying the first filtered channel energy density profile by a weighting factor operable to selectively weight the effect of the first channel energy density profile in order to effect a rate of timing tracking.

34. The apparatus as defined in claim 27, further comprising:
means for multiplying the first channel energy density profile by a corresponding weighting factor operable to weight the contribution of the first channel energy density profile in the composite channel energy density profile.

35. The apparatus as defined in claim 27, further comprising:
means for inputting the composite channel energy density profile to a timing tracking algorithm, which determines a timing decision based at least in part on the composite channel energy density profile.

36. The apparatus as defined in claim 27, further comprising:
a third means for filtering the second channel energy density profile to generate a third filtered channel energy density profile, the third means for filtering having a third bandwidth; and
a fourth means for filtering the second channel energy density profile to generate a fourth filtered channel energy density profile, the fourth means for filtering having a fourth bandwidth, wherein the third bandwidth is narrower than the fourth bandwidth,
wherein the means for combining comprises means for combining at least the first, second, third, and fourth filtered channel energy density profiles to form the composite channel energy density profile.

37. A non-transitory computer-readable storage medium comprising instructions that cause a computer to:
determine at least two coherent channel impulse responses based on signals respectively received by antennas of a multiple antenna wireless device;
determine at least two incoherent channel energy density profiles respectively based on the coherent channel impulse responses, wherein the at least two incoherent channel energy density profiles comprise at least a first channel energy density profile and a second channel energy density profile;
filter the first channel energy density profile with a first low pass filter having a first bandwidth to generate a first filtered channel energy density profile;
filter the first channel energy density profile with a second low pass filter having a second bandwidth to generate a second filtered channel energy density profile, wherein the first bandwidth is narrower than the second bandwidth; and
combine at least the first and second filtered channel energy density profiles to form a composite channel energy density profile.

38. The non-transitory computer-readable storage medium of claim 37, wherein the instructions that cause the computer to filter the first channel energy density profile with the second low pass filter comprise instructions that cause the computer to:
filter out estimation noise from the first channel energy density profile.

39. The non-transitory computer-readable storage medium of claim 37, wherein the instructions that cause the computer to filter the first channel energy density profile with the first low pass filter comprise instructions that cause the computer to:
filter out channel fluctuations due to fading from the first channel energy density profile.

40. The non-transitory computer-readable storage medium of claim 37, wherein the instructions that cause the computer to filter the first channel energy density profile with the second low pass filter comprise instructions that cause the computer to:
filter to account for instantaneous channel behavior in the first channel energy density profile.

41. The non-transitory computer-readable storage medium of claim 37, wherein the instructions that cause the computer to filter the first channel energy density profile with the first low pass filter comprise instructions that cause the computer to:
filter to account for long-term channel behavior in the first channel energy density profile.

42. The non-transitory computer-readable storage medium of claim 37, further comprising instructions that cause the computer to:
multiply the first filtered channel energy density profile by a weighting factor operable to selectively weight the effect of the first filtered channel energy density profile in order to effect a rate of timing tracking.

43. The non-transitory computer-readable storage medium of claim 37, further comprising instructions that cause the computer to:
multiply the first channel energy density profile by a corresponding weighting factor operable to weight the contribution of the first channel energy density profile in the composite channel energy density profile.

44. The non-transitory computer-readable storage medium of claim 37, further comprising instructions that cause the computer to:
input the composite channel energy density profile to a timing tracking algorithm, which determines a timing decision based at least in part on the composite channel energy density profile.

45. The non-transitory computer-readable storage medium of claim 37, further comprising instructions that cause the computer to:
filter the second channel energy density profile with a third low pass filter having a third bandwidth to generate a third filtered channel energy density profile; and
filter the second channel energy density profile with a fourth low pass filter having a fourth bandwidth to generate a fourth filtered channel energy density profile, wherein the third bandwidth is narrower than the fourth bandwidth, and
wherein the instructions that cause the computer to combine comprises instructions that cause the computer to combine at least the first, second, third, and fourth filtered channel energy density profiles to form the composite channel energy density profile.

* * * * *